US005562969A

United States Patent [19]

Sakamoto et al.

[11] Patent Number: 5,562,969

[45] Date of Patent: Oct. 8, 1996

[54] DECORATIVE BOARD

[75] Inventors: Keiji Sakamoto; Yoshio Takahashi; Yasukichi Ogasawara, all of Tokyo, Japan

[73] Assignee: Toyo Ink Manufacturing Co., Ltd., Tokyo, Japan

[21] Appl. No.: 285,703

[22] Filed: Aug. 4, 1994

[30] Foreign Application Priority Data

Aug. 6, 1993 [JP] Japan .................................. 5-196447
Mar. 25, 1994 [JP] Japan .................................. 6-055453

[51] Int. Cl.$^6$ .............................. B32B 3/00; B32B 27/38; B32B 29/00

[52] U.S. Cl. .......................... 428/207; 428/142; 428/149; 428/208; 428/448; 428/414; 428/415; 428/435; 428/688; 428/430; 428/480; 428/522; 428/477.7; 428/537.5; 428/315.9; 428/312.4; 428/312.6

[58] Field of Search .................................... 428/207, 208, 428/425.5, 688, 142, 149, 312.6, 315.9, 312.4, 414, 415, 430, 455, 477.7, 448, 480, 522, 537.5

[56] References Cited

U.S. PATENT DOCUMENTS 5,019,440 5/1991 Ogasawara et al. .

OTHER PUBLICATIONS

Derwent Application No. 80–90903C, Week 8051, Nov. 2, 1980.

*Primary Examiner*—P. C. Sluby
*Attorney, Agent, or Firm*—Sughrue, Mion, Zinn, Macpeak & Seas

[57] ABSTRACT

A decorative board comprising an inorganic substrate comprising an inorganic material other than a metal or a glass and having an organic or inorganic layer on a surface thereof, the substrate having consecutively thereon (1) a transfer base layer comprising a polyol-curing polyurethane resin, which is transparent or contains a colorant so as to have a color with hiding properties; (2) a transfer-printed layer having a pattern; and (3) a topcoat layer comprising a polyol-curing polyurethane resin.

8 Claims, 1 Drawing Sheet

DECORATIVE BOARD

FIELD OF THE INVENTION

The present invention relates to a decorative board for use as an inner or outer wall material or panel material for a house or in interior or exterior house decoration, etc., which decorative board has a highly attractive appearance and a high degree of water resistance.

BACKGROUND OF THE INVENTION

A method of producing a conventional decorative board for use as a panel material for inner walls, ceilings, etc. of a house or in interior house decoration or other applications is disclosed in, e.g., JP-B-59-1111 and JP-B-60-58717, in which method a polyol-curing polyurethane resin coating composition is used and a decorative pattern is formed by transfer. (The term "JP-B" as used herein means an "examined Japanese patent publication.")

Since a distinct and delicate colored pattern is obtained by this technique, the decorative board obtained is of high decorative value.

However, the application of this technique to an inorganic substrate made of neither a metal nor a glass, such as an autoclaved calcium silicate board (slate board), has had a drawback that since the polyol-curing polyurethane resin coating composition applied infiltrates partially into the substrate because of the high porosity of the substrate, a transfer ink cannot be transferred in a sufficient amount and this not only is apt to result in an indistinct pattern but also gives a decorative board that after a water resistance test (immersion at 50° C. for 240 hours) undergoes coating film peeling due to the cohesive failure of the substrate.

SUMMARY OF THE INVENTION

An object of the present invention is to overcome the conventional drawback in application to inorganic substrates made of inorganic materials other than a metal or a glass, and to provide a decorative board combining a highly attractive appearance and high performance, that is, good in both ink transferability and water resistance.

Other objects and effects of the present invention will be apparent from the following description.

That is, ink transferability and water resistance have been imparted by disposing a transfer base layer formed from a polyol-curing polyurethane resin coating composition which is transparent or contains a colorant so as to have any desired color with hiding properties, a transfer-printed layer having a desired pattern, and a topcoat layer formed from a polyol-curing polyurethane resin coating composition, on an inorganic substrate having an organic or inorganic layer on the surface thereof.

The present invention relates to a decorative board comprising an inorganic substrate comprising an inorganic material other than a metal or a glass and having an organic or inorganic layer on a surface thereof, the substrate having consecutively thereon (1) a transfer base layer comprising a polyol-curing polyurethane resin, which is transparent or contains a colorant so as to have a color with hiding properties;

(2) a transfer-printed layer having a pattern; and (3) a topcoat layer comprising a polyol-curing polyurethane resin.

BRIEF DESCRIPTION OF DRAWINGS

The FIGURE shows a schematic sectional view of a decorative board according to one embodiment of the present invention.

DETAILED DESCRIPTION OF THE INVENTION

Figure 1:
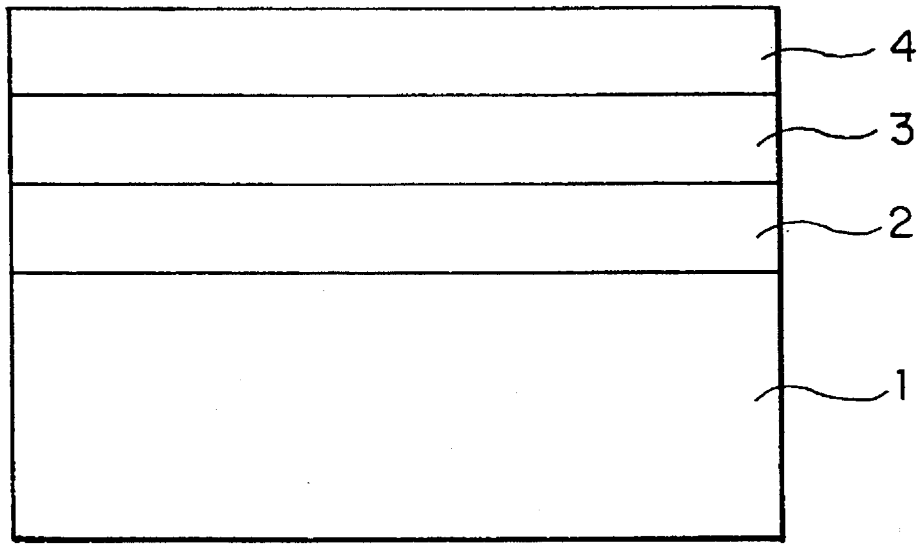

The present invention is first outlined with reference to the drawing.

The FIGURE shows a schematic sectional view of a decorative board produced by the present invention. The decorative board comprises an inorganic substrate 1 having an organic or inorganic layer on a surface thereof. A transfer base layer 2, a transfer-printed layer 3, and a topcoat layer 4 are provided consecutively on the surface of the inorganic substrate 1.

The inorganic substrate 1 comprises an inorganic material which is neither a metal nor a glass. Examples thereof include a slate board, an autoclaved cement/calcium silicate board, a plasterboard, a concrete board, a brick, and a tile. Such substrates are not particularly limited in thickness, but substrates with thicknesses of from 1 to 10 mm are preferred for practical use. An organic or inorganic layer is formed on the surface of the substrate, whereby the infiltration of a coating composition for the transfer base layer into the substrate is prevented to ensure ink transferability and, at the same time, the permeation of water into the substrate is prevented to also ensure water resistance. With respect to slate boards and autoclaved cement/calcium silicate boards, asbestos-free ones is preferably used from the standpoint of safety and health.

The organic or inorganic layer is not particularly limited as far as it exhibits the above-mentioned functions.

Examples of the organic layer include those obtained by coating a coating composition (such as an organic solvent-type coating composition, an aqueous coating composition, and a non-solvent-type coating composition) on the surface of the substrate, followed by drying or curing. The coating composition may comprise a synthetic resin (such as an epoxy resin, a polyester resin, an alkyd resin, a vinylchloride resin, an acrylic resin and the like) and may further comprise other resins (such as a polyamide resin, an isocyanate resin, a melamine resin and the like) as well as a pigment, other additives, a solvent, water and the like. The drying and curing the organic layer may be conducted by drying at room temperature, drying with a hot air stream, drying with infrared irradiation, curing with ultraviolet irradiation, curing with irradiation of electron beams and the like means. The thickness of the organic layer is generally from 2 to 200 μm, and preferably from 5 to 100 μm. If the thickness is too large, cracks tend to be formed due to internal strain. If it is too thin, the above-mentioned functions of the organic layer tends to be insufficient.

Examples of the inorganic layer include those obtained by coating ceramics materials on the surface of the substrate, followed by baking. For example, a ceramic composition comprising a glass frit mixed with alumina or clay is coated on the surface of the substrate and baked at 800° to 1,200° C., and a glass frit is further coated and baked at 800° C. The thickness of the inorganic layer is generally from 5 to 300 μm, and preferably from 10 to 100 μm. If it is too thin, the strength of the inorganic layer tends to be insufficient, resulting in cracking.

The substrate is preferably degreased with an alkali before providing the transfer base layer 1, because contaminants such as an organic matter may be adhered thereto. For the purpose of further improving adhesion and water resistance, a surface treatment with a silane coupling agent may be conducted if desired.

Examples of the silane coupling agent include an epoxy, amino, vinyl, methacrylic, or mercapto type silane coupling agent. Such a silane coupling agent is generally diluted with an alcohol and applied by a known technique such as air spraying, roll coating, curtain coating, or dipping, and the coating is dried with heating if necessary.

The transfer base layer 2 and the topcoat layer 4 tenaciously adhere to the substrate and serve to fix the transfer-printed layer 3 to attain various performances of the decorative board. The transfer base layer 2 and the topcoat layer 4 are formed from a polyol-curing polyurethane resin coating composition. The polyol-curing polyurethane resin coating composition comprises a known polyol component and a known polyisocyanate component, which are mixed together at the time of use.

Examples of the polyol component include a fluorinated polyol, an acrylic polyol, a polyester polyol, and a polyether polyol. Examples of the fluorinated polyol include hydroxylated fluorocopolymers which have a fluorine content of 10% by weight or higher in terms of the content of fluorine atoms attributable to fluoroolefin units and are soluble in solvents. Examples of the acrylic polyol include polymers obtained by a known method using a hydroxyalkyl acrylate or methacrylate as a monomer. Examples of the polyester polyol include those obtained by the condensation of a polycarboxylic acid or an anhydride thereof with a polyol. Examples of the polyether polyol include those obtained by the polyoxyalkylation of polyols.

Examples of the polyisocyanate component include p-phenylene diisocyanate, biphenyl diisocyanate, tolylene diisocyanate, 3,3'-dimethyl-4,4'-biphenylene diisocyanate, 1,4-tetramethylene diisocyanate, hexamethylene diisocyanate, 2,2,4-trimethyl-1,6-hexylene diisocyanate, methylenebis(phenyl isocyanate), isophorone diisocyanate, methylcyclohexyl diisocyanate, polyphenylenepolymethylene diisocyanate, prepolymers having terminal isocyanate groups, and polyfunctional organosilicon compounds having directly silicon-bonded isocyanate groups. Especially preferred are non-yellowing polyisocyanate compounds. Blocked isocyanate resins can also be used.

The polyol component and the polyisocyanate component are preferably used after being mixed in an equivalent ratio (isocyanate group/hydroxyl group) of from 0.9 to 1.4. If the ratio is outside the above-specified range, a sufficient cured coating film tends not to be obtained and, hence, the resulting decorative board may have poor performances concerning water resistance, adhesion, coating film hardness, weatherability, etc. For use in forming the transfer base layer, the polyol and polyisocyanate components may be mixed with a pigment, a filler, a solvent, and other known additives by suitable known techniques to prepare coating compositions of desired colors.

The coating compositions may be applied by a known coating method, e.g., curtain flow coating, roll coating, spraying, brushing, or dipping, after being suitably diluted with a solvent for viscosity regulation. The thickness of the transfer base layer and that of the topcoat layer are generally from 10 to 60 μm. It is preferred that the coatings be heat-dried in order to carry out solvent removal and curing in a short time.

For forming the transfer-printed layer 3, an ink prepared by dispersing a pigment into a binder can be used. Examples of the binders include solvent-soluble fluorocopolymers, vinyl resins, thermoplastic acrylic resins, thermoplastic polyester resins, olefin resins, and the polyol resins mentioned above. The binders may be used singly or in combination of two or more thereof. The transfer-printed layer used in the present invention is generally formed by transferring to the surface of the transfer base layer a printed image of any desired pattern formed beforehand on a temporary substrate sheet, e.g., a polyester film, by gravure printing, screen printing, offset printing, etc.

The present invention is explained below by reference to examples, but is not construed as being limited thereto.

Substrates, compositions for forming transfer base layers, transfer films for forming transfer-printed layers, and compositions for forming topcoat layers used in the Examples and Comparative Examples are shown below. In the examples, all percents are by weight.

Substrate 1:

Autoclaved cement/calcium silicate board having an inorganic coating layer and a vitreous layer on the surface thereof (thickness: 5 mm) ("Grasal Board", manufactured by Toray Grasal K.K.).

Substrate 2:

Slate board having an ultraviolet-cured coating layer on the surface thereof (thickness: 5 mm). The ultraviolet-cured coating layer was prepared by coating a coating composition having the following formulation on the surface of the slate board with a spray gun, the solvents were removed in a hot air oven, and then the coating was cured by irradiating with ultraviolet ray from a high-pressure mercury lamp (80 W/cm) for 3 seconds.

| | |
|---|---|
| Urethane acrylate ("Olester RA-1353" manufactured by Mitsui Toatsu Chemicals, Inc.) | 30.0% |
| 2,2'-dimethoxy-2-phenyldicetophenon | 0.5% |
| Ethyl acetate | 30.0% |
| Toluene | 22.0% |
| Isopropyl alcohol | 7.5% |
| Cellosolve acetate | 10.0% |

Substrate 3:

Autoclaved calcium silicate board (untreated) (thickness: 5 mm).

| | Transfer Base Layer A: | |
|---|---|---|
| | % | Remarks |
| Titanium white | 15.00 | |
| Solvent-soluble fluororesin | 40.00 | Lumiflon LF-100, manufactured by Asahi Glass Co., Ltd. |
| Hexamethylene diisocyanate | 3.60 | Sumidule N-3500, manufactured by Sumitomo Bayer Urethane Co., Ltd. |
| Xylene | 23.40 | |
| Toluene | 18.00 | |
| | 100.00 | |

The above formulation was the result of the 8/1 mixing of a main ingredient and a hardener.

Equivalent ratio (isocyanate/hydroxyl group)=1.0

| Transfer Base Layer B: | % | Remarks |
|---|---|---|
| Titanium white | 15.00 | |
| Acrylic polyol | 40.00 | Acrydec A-801, manufactured by Dainippon Ink & Chemicals, Inc. |
| Hexamethylene diisocyanate | 6.37 | Duranate 24A-100, manufactured by Asahi Chemical Industry Co., Ltd. |
| Butyl acetate | 23.63 | |
| Toluene | 15.00 | |
| | 100.00 | |

The above formulation was the result of the 6/1 mixing of a main ingredient and a hardener.

Equivalent ratio (isocyanate/hydroxyl group)=1.0

| Transfer Base Layer C: | % | Remarks |
|---|---|---|
| Titanium white | 14.38 | |
| Acrylic polyol | 38.36 | Acrydec A-801, manufactured by Dainippon Ink & Chemicals, Inc. |
| Hexamethylene diisocyanate | 7.94 | Duranate 24A-100, manufactured by Asahi Chemical Industry Co., Ltd. |
| Butyl acetate | 22.52 | |
| Toluene | 16.80 | |
| | 100.00 | |

The above formulation was the result of the 6/1.3 mixing of a main ingredient and a hardener.

Equivalent ratio (isocyanate/hydroxyl group)=1.3

| Transfer Base Layer D: | % | Remarks |
|---|---|---|
| Titanium white | 15.44 | |
| Acrylic polyol | 41.18 | Acrydec A-801, manufactured by Dainippon Ink & Chemicals, Inc. |
| Hexamethylene diisocyanate | 6.55 | Duranate 24A-100 |
| Butyl acetate | 21.16 | |
| Toluene | 15.67 | |
| | 100.00 | |

The above formulation was the result of the 6/0.8 mixing of a main ingredient and a hardener.

Equivalent ratio (isocyanate/hydroxyl group)=0.8

Transfer Film:

| Name | Temporary Substrate | Ink | Print Pattern |
|---|---|---|---|
| Transfer film A | poly(ethylene terephthalate) | fluoropolymer type*[1] | granite pattern |
| Transfer film B | poly(ethylene terephthalate) | vinyl chloride/ vinyl acetate copolymer type | granite pattern |

-continued

| Topcoat Layer A: | % | Remarks |
|---|---|---|
| Solvent-soluble fluororesin | 50.00 | Lumiflon LF-302, manufactured by Asahi Glass Co., Ltd. |
| Hexamethylene diisocyanate | 4.16 | Sumidule N-3500, manufactured by Sumitomo Bayer Urethane Co., Ltd. |
| Xylene | 23.54 | |
| Toluene | 12.30 | |
| Butyl acetate | 10.00 | |
| | 100.00 | |

Note
*[1]fluorocopolymer containing fluoroolefin units.

The above formulation was the result of the 10/1 mixing of a main ingredient and a hardener.

Equivalent ratio (isocyanate/hydroxyl group)=1.0

| Topcoat Layer B: | % | Remarks |
|---|---|---|
| Acrylic polyol | 50.00 | Hitaloid 3008, manufactured by Hitachi Chemical Co., Ltd. |
| Hexamethylene diisocyanate | 11.34 | Sumidule N-75, manufactured by Sumitomo Bayer Urethane Co., Ltd. |
| Tin octix | 0.10 | manufactured by Nihon Kagaku Sangyo Co., Ltd. |
| Methyl ethyl ketone | 14.56 | |
| Toluene | 14.00 | |
| Butyl acetate | 10.00 | |
| | 100.00 | |

The above formulation was the result of the 4/1 mixing of a main ingredient and a hardener.

Equivalent ratio (isocyanate/hydroxyl group)=1.0

Various tests were conducted in the examples according to the methods described below.

Transferability Test:

A transfer base layer was applied on a substrate and baked. A transfer film was thereafter laminated thereto with a laminator, while the temperature of the substrate was maintained at the value specified in each Example. The PET substrate was then stripped off to transfer the ink, and the transferability of the ink was examined.

Boiling-Water Resistance Test:

The back-side surface and edges of a test piece were sealed with the same coating composition as that used for the transfer base layer. The resulting test piece was immersed in boiling water and boiled for 8 hours. The test piece was then taken out and allowed to stand at room temperature for 2 hours. The surface coating film was crosshatch-wise incised with a cutting knife to make 100 1-mm squares. Thereafter, a cellophane adhesive tape was applied by firmly pressing it against the surface, and was then stripped. The number x of the squares remaining unpeeled per 100 squares was counted, the results being shown in terms of x/100.

Water Resistance Test:

The back-side surface and edges of a test piece were sealed with the same coating composition as that used for the transfer base layer. The resulting test piece was immersed in 50° C. warm water for 10 days, and was then taken out and allowed to stand at room temperature for 2 hours. The coating film was crosshatch-wise incised with a cutting knife to make 100 1-mm squares. Thereafter, a cellophane adhesive tape was applied by firmly pressing it against the surface, and was then stripped. The number x of the squares remaining unpeeled per 100 squares was counted, the results being shown in terms of x/100.

EXAMPLE 1

Substrate 1 having length and width dimensions of 300×300 mm and a thickness of 5 mm ("Grasal Board", manufactured by Toray Grasal K.K.) was washed by showering for 1 minute with 5% aqueous caustic soda solution having a temperature of 40° C. and then sprayed with ion-exchanged water for 30 seconds to remove the alkali solution remaining on the surface. The substrate was then dried in a 100° C. hot air stream for 30 seconds. An epoxy silane coupling agent was then sprayed thereon and the substrate was dried in an 80° C. hot air stream for 1 minute.

The substrate was then coated with the composition for Transfer Base Layer A by air spraying at a thickness of 20 to 30 μm on a dry basis and the coating was dried in a 90° C. hot air stream for 10 minutes to form a white transfer base layer. After the coated substrate was heated to 90° C., Transfer Film A was laminated thereto with heating at 85° C. and pressing at 4 Kg/cm$^2$ using a rubber roll having a JIS hardness of 60. The laminate was cooled to 40° C. and the poly(ethylene terephthalate) film was then stripped off to transfer the granite pattern to the transfer base layer to thereby form a transfer-printed layer. The composition for Topcoat Layer A prepared by mixing a main ingredient and a hardener in a ratio of 10/1 was further applied by air spraying at a thickness of 30 μm on a dry basis, and the coating was dried in a 100° C. hot air stream for 40 minutes to form a topcoat layer.

The decorative board thus produced was of high decorative value, with the granite pattern being finished distinctly. The decorative board was satisfactory in boiling-water resistance and water resistance.

EXAMPLE 2

Substrate 1 having length and width dimensions of 300×300 mm and a thickness of 5 mm was treated in the same manner as in Example 1.

The substrate was then coated with the composition for Transfer Base Layer B by air spraying at a thickness of 20 to 30 μm on a dry basis and the coating was dried in a 80° C. hot air for 10 minutes to form a white transfer base layer. After the resulting substrate was heated to 80° C., Transfer Film B was laminated thereto with heating at 80° C. and pressing at 4 Kg/cm$^2$ using a rubber roll having a JIS hardness of 60. The laminate was cooled to 40° C. and the poly(ethylene terephthalate) film was then stripped off to transfer the granite pattern to the transfer base layer to thereby form a transfer-printed layer. The composition for Topcoat Layer B prepared by mixing a main ingredient and a hardener in a ratio of 4/1 was further applied by air spraying at a thickness of 30 μm on a dry basis, and the coating was dried in a 100° C. hot air stream for 40 minutes to form a topcoat layer.

The decorative board thus produced was of high decorative value, with the granite pattern being finished distinctly and with good ink transferability. The decorative board was satisfactory in boiling-water resistance and water resistance.

EXAMPLE 3

Substrate 1 having length and width dimensions of 300×300 mm and a thickness of 5 mm was treated in the same manner as in Example 1.

The substrate was then coated with the composition for Transfer Base Layer C by air spraying at a thickness of 20 to 30 μm on a dry basis and the coating was dried in an 80° C. hot air stream for 10 minutes to form a white transfer base layer. After the coated substrate was heated to 80° C., Transfer Film B was laminated thereto with heating at 80° C. and pressing at 4 Kg/cm$^2$ using a rubber roll having a JIS hardness of 60. The laminate was cooled to 40° C. and the poly(ethylene terephthalate) film was then stripped off to transfer the granite pattern to the transfer base layer to thereby form a transfer-printed layer. The composition for Topcoat Layer B prepared by mixing a main ingredient and a hardener in a ratio of 4/1 was further applied by air spraying at a thickness of 30 μm on a dry basis, and the coating was dried in a 100° C. hot air stream for 40 minutes to form a topcoat layer.

The decorative board thus produced was of high decorative value, with the granite pattern being finished distinctly and with good ink transferability. The decorative board was satisfactory in boiling-water resistance and water resistance.

EXAMPLE 4

Substrate 1 having length and width dimensions of 300×300 mm and a thickness of 5 mm was treated in the same manner as in Example 1.

The substrate was then coated with the composition for Transfer Base Layer D by air spraying at a thickness of 20 to 30 μm on a dry basis and the coating was dried in an 80° C. hot air stream for 10 minutes to form a white transfer base layer. After the coated substrate was heated to 80° C., Transfer Film B was laminated thereto with heating at 80° C. and pressing at 4 Kg/cm$^2$ using a rubber roll having a JIS hardness of 60. The laminate was cooled to 40° C. and the poly(ethylene terephthalate) film was then stripped off to transfer the granite pattern to the transfer base layer to thereby form a transfer-printed layer. The composition for Topcoat Layer B prepared by mixing a main ingredient and a hardener in a ratio of 4/1 was further applied by air spraying at a thickness of 30 μm on a dry basis, and the coating was dried in a 100° C. hot air stream for 40 minutes to form a topcoat layer.

The decorative board thus produced was of high decorative value, with the granite pattern being finished distinctly and with good ink transferability. The decorative board was satisfactory in boiling-water resistance and water resistance.

EXAMPLE 5

Substrate 2 having length and width dimensions of 300×300 mm and a thickness of 5 mm was sprayed with an epoxy silane coupling agent and dried in 80° C. hot air for 1 minute.

The substrate was then coated with the composition for Transfer Base Layer B by air spraying at a thickness of 20 to 30 μm on a dry basis and the coating was dried in an 80° C. hot air stream for 10 minutes to form a white transfer base layer. After the coated substrate was heated to 80° C., Transfer Film B was laminated thereto with heating at 80° C. and pressing at 4 Kg/cm$^2$ using a rubber roll having a JIS hardness of 60. The laminate was cooled to 40° C. and the poly(ethylene terephthalate) film was then stripped off to transfer the granite pattern to the transfer base layer to thereby form a transfer-printed layer. The composition for Topcoat Layer B prepared by mixing a main ingredient and a hardener in a ratio of 4/1 was further applied by air spraying at a thickness of 30 μm on a dry basis, and the coating was dried in a 100° C. hot air stream for 40 minutes to form a topcoat layer.

The decorative board thus produced was of high decorative value, with the granite pattern being finished distinctly and with good ink transferability. The decorative board was satisfactory in boiling-water resistance and water resistance.

COMPARATIVE EXAMPLE 1

Substrate 3 having length and width dimensions of 300×300 mm and a thickness of 5 mm was coated with the composition for Transfer Base Layer B by air spraying at a thickness of 20 to 30 μm on a dry basis and the coating was dried in a 80° C. hot air for 10 minutes to form a white transfer base layer. After the coated substrate was heated to 80° C., Transfer Film B was laminated thereto with heating at 80° C. and pressing at 4 $Kg/cm^2$ using a rubber roll having a JIS hardness of 60. The laminate was cooled to 40° C. and the poly(ethylene terephthalate) film was then stripped off to transfer the granite pattern to the transfer base layer to thereby form a transfer-printed layer. The composition for Topcoat Layer B prepared by mixing a main ingredient and a hardener in a ratio of 4/1 was further applied by air spraying at a thickness of 30 μm on a dry basis, and the coating was dried in a 100° C. hot air stream for 40 minutes to form a topcoat layer.

The decorative board thus produced was of low decorative value since the granite pattern was indistinct because of partial poor ink transfer due to the infiltration of the transfer base layer into the substrate. In each of the boiling-water resistance test and the water resistance test, the decorative board developed blisters and the adhesion was 0/100; the coated layers were peeled as a result of the cohesive failure of the substrate.

The results of the transferability test, boiling-water resistance test, and water resistance test for the decorative boards obtained in Examples 1 to 5 and Comparative Example 1 are summarized in Table 1. The test results show that all the decorative boards obtained in the Examples were satisfactory and useful for decoration, whereas the decorative board of the Comparative Example was unsatisfactory in appearance and water resistance and unusable as a decorative board.

While the invention has been described in detail and with reference to specific examples thereof, it will be apparent to one skilled in the art that various changes and modifications can be made therein without departing from the spirit and scope thereof.

What is claimed is:

1. A decorative board comprising an inorganic substrate comprising an inorganic material other than a metal or a glass and having an organic or inorganic layer on a surface thereof, said substrate having consecutively thereon (1) a transfer base layer comprising a polyol-curing polyurethane resin, which is transparent or contains a colorant so as to have a color with hiding properties;

(2) a transfer-printed layer having a pattern; and (3) a topcoat layer comprising a polyol-curing polyurethane resin.

2. A decorative board as claimed in claim 1, wherein said inorganic substrate comprises an autoclaved cement/calcium silicate board having an inorganic coating layer and a vitreous layer on a surface of said inorganic substrate.

3. A decorative board as claimed in claim 1, wherein said organic or inorganic layer has a function in that infiltration of said transfer base layer into said substrate is prevented.

4. A decorative board as claimed in claim 3, wherein said substrate is a slate board, an autoclaved cement/calcium silicate board, a plasterboard, a concrete board, a brick, or a tile.

5. A decorative board as claimed in claim 1, wherein said organic or inorganic layer is an inorganic layer formed by baking a ceramic composition comprising a glass frit mixed with alumina or clay.

6. A decorative board as claimed in claim 1, wherein said organic or inorganic layer is an organic layer formed by coating a composition comprising a synthetic resin, a pigment, and a solvent.

7. A decorative board as claimed in claim 6, wherein said synthetic resin is an epoxy resin, a polyester resin, an alkyd resin, a vinylchloride resin, or an acrylic resin.

TABLE 1

| | Substrate | Transfer base layer** | Transfer-printed layer | Top-coat layer | Transfer-ability*** | Boiling-water resistance | Water resistance |
|---|---|---|---|---|---|---|---|
| Example 1 | 1 | A (1.0) | A | fluoro-resin | O | 100/100 | 100/100 |
| Example 2 | 1 | B (1.0) | B | acrylic resin | O | 100/100 | 100/100 |
| Example 3 | 1 | C (1.3) | B | acrylic resin | O | 100/100 | 100/100 |
| Example 4 | 1 | D (0.8) | B | acrylic resin | O | 100/100 | 100/100 |
| Example 5 | 2 | B (1.0) | B | acrylic resin | O | 100/100 | 100/100 |
| Comparative Example 1 | 3 | B (1.0) | B | acrylic resin | X | 0/100* | 0/100* |

Note:
*Blistering occurred.
**The numbers in parentheses are the equivalent ratio (isocyanate/hydroxyl group).
***O: excellent
X: poor According to the present invention, it can be possible to provide a decorative board for use as an inner or outer wall material or panel material for a house or in interior or exterior house decoration, etc. that has a highly attractive appearance and a high degree of water resistance.

8. A decorative board as claimed in claim 6, wherein said composition further comprises a polyamide resin, an isocyanate resin, or a melamine resin.

* * * * *